(12) United States Patent
Hamdi

(10) Patent No.: US 12,086,163 B2
(45) Date of Patent: Sep. 10, 2024

(54) SYSTEMS AND METHODS FOR ASSET FINGERPRINTING

(71) Applicant: Acentium Inc, Boston, MA (US)

(72) Inventor: Amine Hamdi, Boston, MA (US)

(73) Assignee: Acentium Inc, Boston, MA (US)

( * ) Notice: Subject to any disclaimer, the term of this patent is extended or adjusted under 35 U.S.C. 154(b) by 0 days.

(21) Appl. No.: 17/492,101

(22) Filed: Oct. 1, 2021

(65) Prior Publication Data
US 2022/0107965 A1  Apr. 7, 2022

Related U.S. Application Data

(60) Provisional application No. 63/086,881, filed on Oct. 2, 2020.

(51) Int. Cl.
 *G06F 16/28* (2019.01)
 *G06F 16/24* (2019.01)
 *G06F 16/245* (2019.01)
 *G06F 16/90* (2019.01)

(52) U.S. Cl.
 CPC .......... *G06F 16/285* (2019.01); *G06F 16/245* (2019.01)

(58) Field of Classification Search
 None
 See application file for complete search history.

(56) References Cited

U.S. PATENT DOCUMENTS

| | | | |
|---|---|---|---|
| 2015/0120346 A1* | 4/2015 | Byrne | G06Q 10/063 705/7.11 |
| 2018/0192130 A1* | 7/2018 | Liston | H04N 21/8405 |
| 2019/0205467 A1* | 7/2019 | Wold | G06F 16/686 |

OTHER PUBLICATIONS

Pedro Cano; "A Review of Algorithms for Audio Fingerprinting"; 2002; IEEE; pp. 169-173 (Year: 2002).*
Huili Chen; DeepMarks: A Secure Fingerprinting Framework for Digital Rights Management of Deep Learning Models; ACM; 2019; pp. 105-113 (Year: 2019).*
Donald R. Reising; Authorized and Rogue Device Discriminations Using Dimensionally Reduced RF-DNA Fingerprints; 2015; pp. 1180-1192 (Year: 2015).*
International Preliminary Report on Patentability on PCT Appl. Ser. No. PCT/US2021/053180 dated Apr. 13, 2023 (8 pages).
International Search Report and the Written Opinion on PCT Appl. Ser. No. PCT/US2021/053180 (14 pages).

* cited by examiner

*Primary Examiner* — Albert M Phillips, III
*Assistant Examiner* — Jermaine A Mincey
(74) *Attorney, Agent, or Firm* — Foley & Lardner LLP

(57) ABSTRACT

Systems and methods for asset fingerprinting can include probing, by one or more processors, each of a plurality of assets associated with a computer environment, and receiving, responsive to the probe, parameters for the plurality of assets. The one or more processors can cluster, using the parameters, each of the plurality of assets into respective cluster of a plurality of clusters of assets. The one or more processors can determine a profile of a cluster of the plurality of clusters. The profile can define one or more common features of assets of the cluster. The one or more processors can assign the profile of the cluster an unidentified asset of the cluster.

13 Claims, 7 Drawing Sheets

SYSTEMS AND METHODS FOR ASSET FINGERPRINTING

CROSS REFERENCE TO RELATED APPLICATIONS

This application claims priority to, and the benefit of, U.S. Provisional Application No. 63/086,881 filed on Oct. 2, 2020, and entitled "SYSTEMS AND METHODS FOR ASSET FINGERPRINTING," which is incorporated herein by reference in its entirety.

FIELD OF THE DISCLOSURE

The present application relates generally to systems and methods for asset fingerprinting or classification in a computer environment. Specifically, the present application relates to systems and methods for classifying or fingerprinting assets of a computer environment based on clustering of probing parameters of various assets, and using the classification or fingerprinting to identify unknown assets.

SUMMARY OF THE DISCLOSURE

According to at least one aspect, a system can include one or more processors communicatively coupled to a computer environment, and a memory storing computer code instructions. The computer code instructions, when executed by the one or more processors, cause the one or more processors to probe each of a plurality of assets associated with the computer environment, and determine responsive to the probe parameters for the plurality of assets. The one or more processors can cluster, using the parameters, each of the plurality of assets into respective cluster of a plurality of clusters of assets. The one or more processors can determine a profile of a cluster of the plurality of clusters. The profile can define one or more common features of assets of the cluster. The one or more processors can assign the profile of the cluster to an unidentified asset of the cluster.

In some implementations, in determining the profile of the cluster, the one or more processors can query each asset of the cluster for asset information, and compare asset information received from separate assets of the cluster. The one or more processors can identify the one or more common features of the assets in the cluster based on comparison of the asset information received from different assets of the cluster. In querying each asset of the cluster for asset information, the one or more processors can query each asset of the cluster for at least one of asset name, asset description, asset serial number or an operating system associated with the asset.

In some implementations, in determining a profile of the cluster, the one or more processors can determine a common category or a common type of assets in the cluster. In determining a profile of the cluster, the one or more processors can query an asset management database for information about assets in the cluster, and determine the profile of the cluster based on information received responsive to querying the asset management database.

In some implementations, in clustering the plurality of assets of the computer environment, the one or more processors can use at least one of a hierarchical clustering approach, fuzzy clustering, density-based clustering or model-based clustering. The unidentified asset can be an asset that is not listed in an asset management database of the computer environment.

In some implementations, the one or more processors can identify, using one or more communication logs of the computer environment, one or more second assets of the computer environment that communicated with the unidentified asset, and query the one or more second assets for information about the first asset. The one or more processors can determine based on information received from the one or more second assets whether the unidentified asset is an asset of the computer environment or a rogue asset. In some implementations, the one or more processors can probe the plurality of assets associated with the computer environment according to one or more predefined probing patterns.

According to at least another aspect, a method can include probing, by one or more processors, each of a plurality of assets associated with the computer environment, and determining responsive to the probe parameters for the plurality of assets. The method can include clustering, by the one or more processors, using the parameters, each of the plurality of assets into respective cluster of a plurality of clusters of assets. The method can include determining, by the one or more processors, a profile of a cluster of the plurality of clusters. The profile can define one or more common features of assets of the cluster. The method can include assigning, by the one or more processors, the profile of the cluster to an unidentified asset of the cluster.

In some implementations, determining the profile of the cluster can include querying each asset of the cluster for asset information, and comparing asset information received from separate assets of the cluster. The method can include identifying the one or more common features of the assets in the cluster based on comparison of the asset information received from different assets of the cluster. Querying each asset of the cluster for asset information can include querying each asset of the cluster for at least one of asset name, asset description, asset serial number or an operating system associated with the asset.

In some implementations, determining a profile of the cluster can include determining a common category or a common type of assets in the cluster. Determining a profile of the cluster can include querying an asset management database for information about assets in the cluster, and determining the profile of the cluster based on information received responsive to querying the asset management database.

In some implementations, clustering the plurality of assets of the computer environment can include using at least one of a hierarchical clustering approach, fuzzy clustering, density-based clustering or model-based clustering. The unidentified asset can be an asset that is not listed in an asset management database of the computer environment.

In some implementations, the method can include identifying, using one or more communication logs of the computer environment, one or more second assets of the computer environment that communicated with the unidentified asset, and query the one or more second assets for information about the first asset. The method can include determining based on information received from the one or more second assets whether the unidentified asset is an asset of the computer environment or a rogue asset. In some implementations, the method can include probing the plurality of assets associated with the computer environment according to one or more predefined probing patterns.

According to at least another aspect, a computer-readable medium can include computer code instructions stored thereon. The computer code instructions when executed by one or more processors can cause the one or more processors to probe each of a plurality of assets associated with a computer environment, and determine responsive to the probe parameters for the plurality of assets. The one or more processors can cluster, using the parameters, each of the plurality of assets into respective cluster of a plurality of clusters of assets. The one or more processors can determine a profile of a cluster of the plurality of clusters. The profile can define one or more common features of assets of the cluster. The one or more processors can assign the profile of the cluster to an unidentified asset of the cluster.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes systems and methods for asset fingerprinting in a computer environment.

A. Computing and Network Environment

Figure 1A:
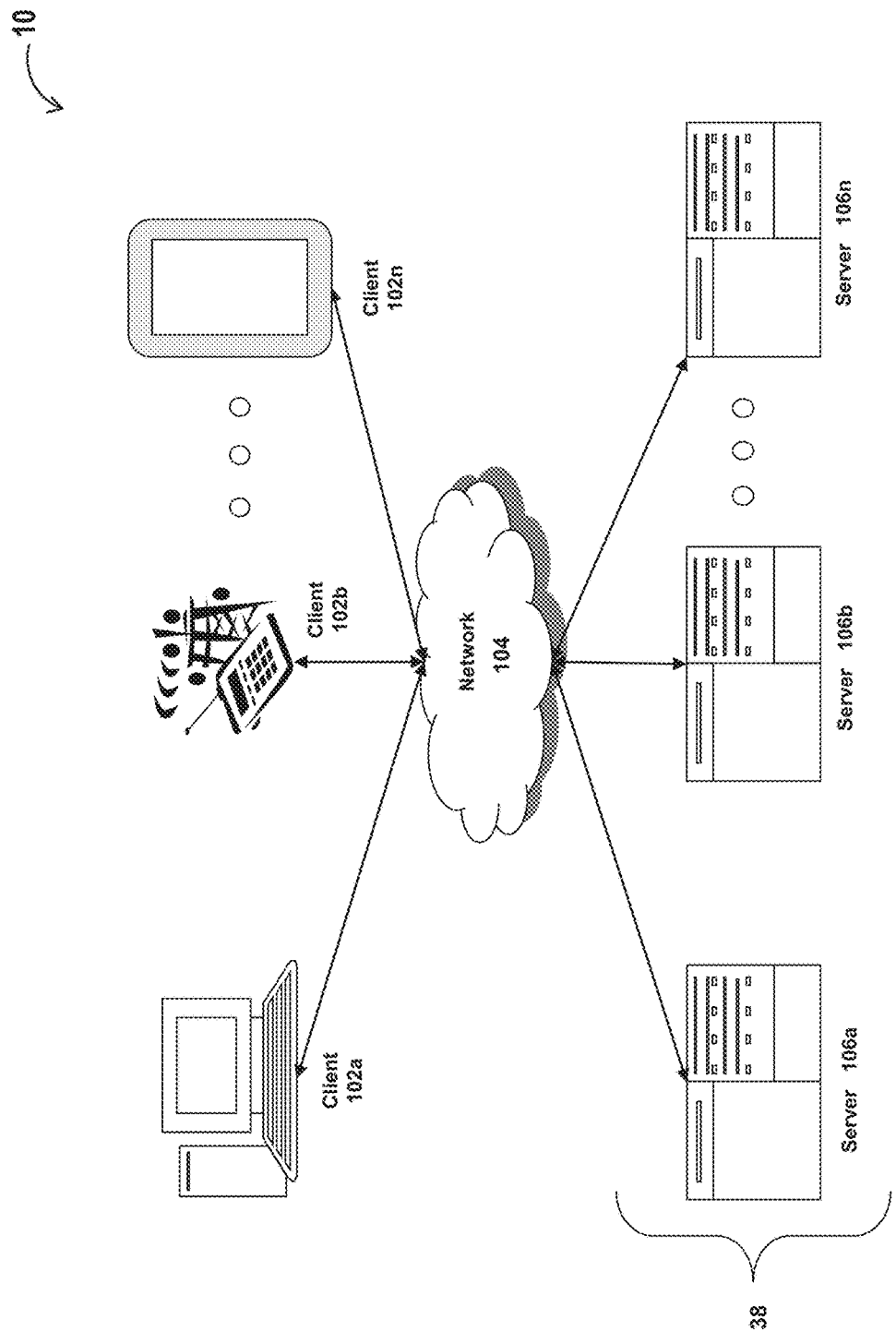
FIG. 1A is a block diagram depicting an embodiment of a network environment comprising local devices in communication with remote devices.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
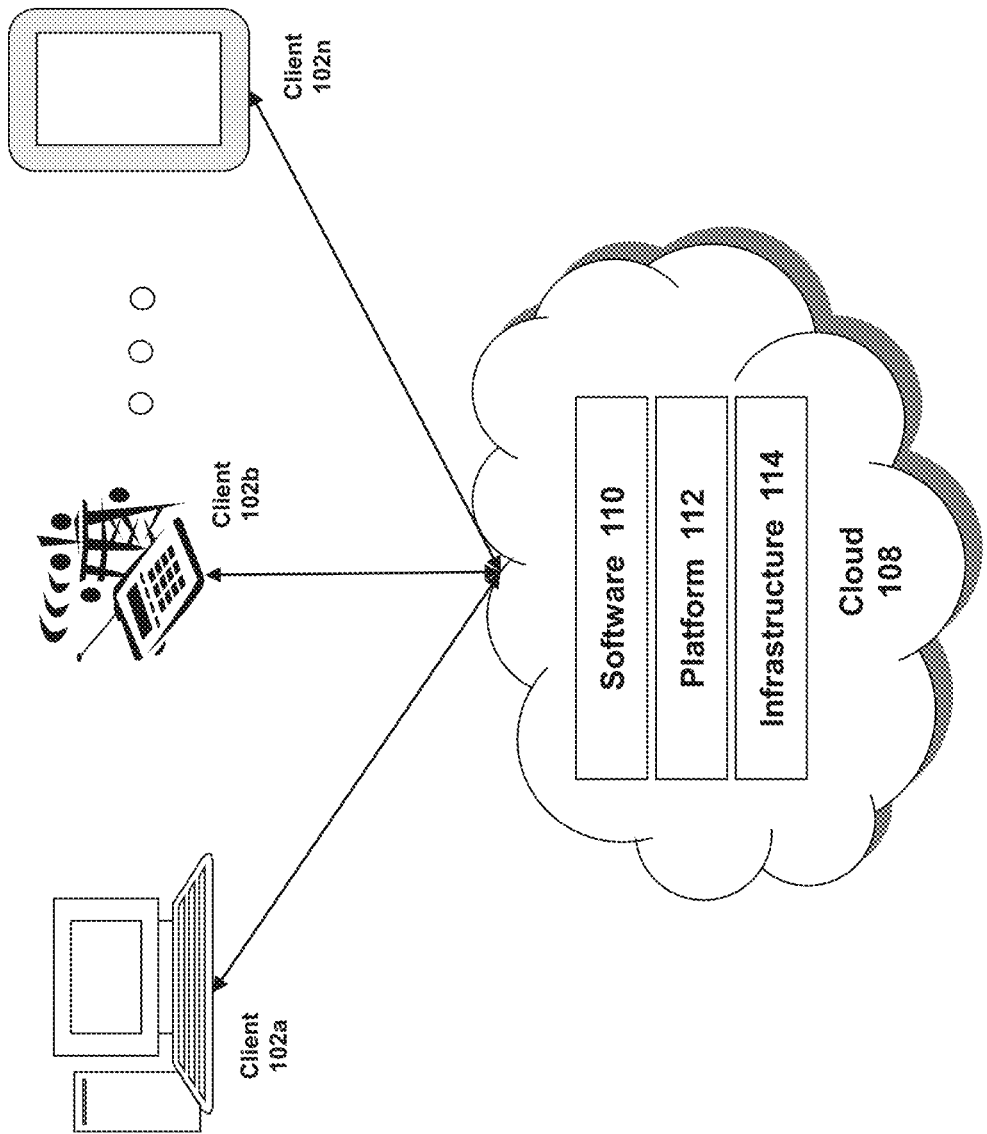
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
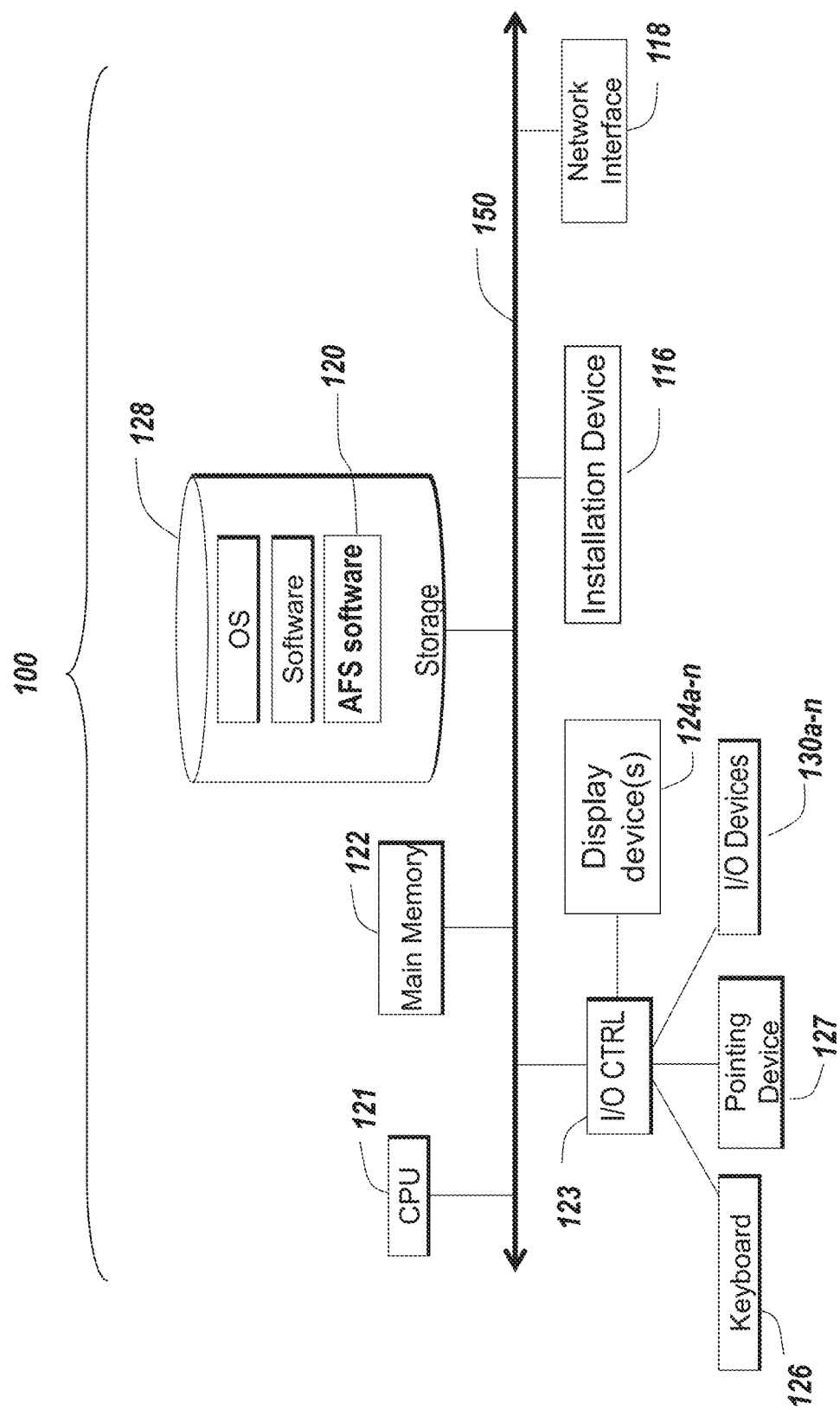
Figure 1D:
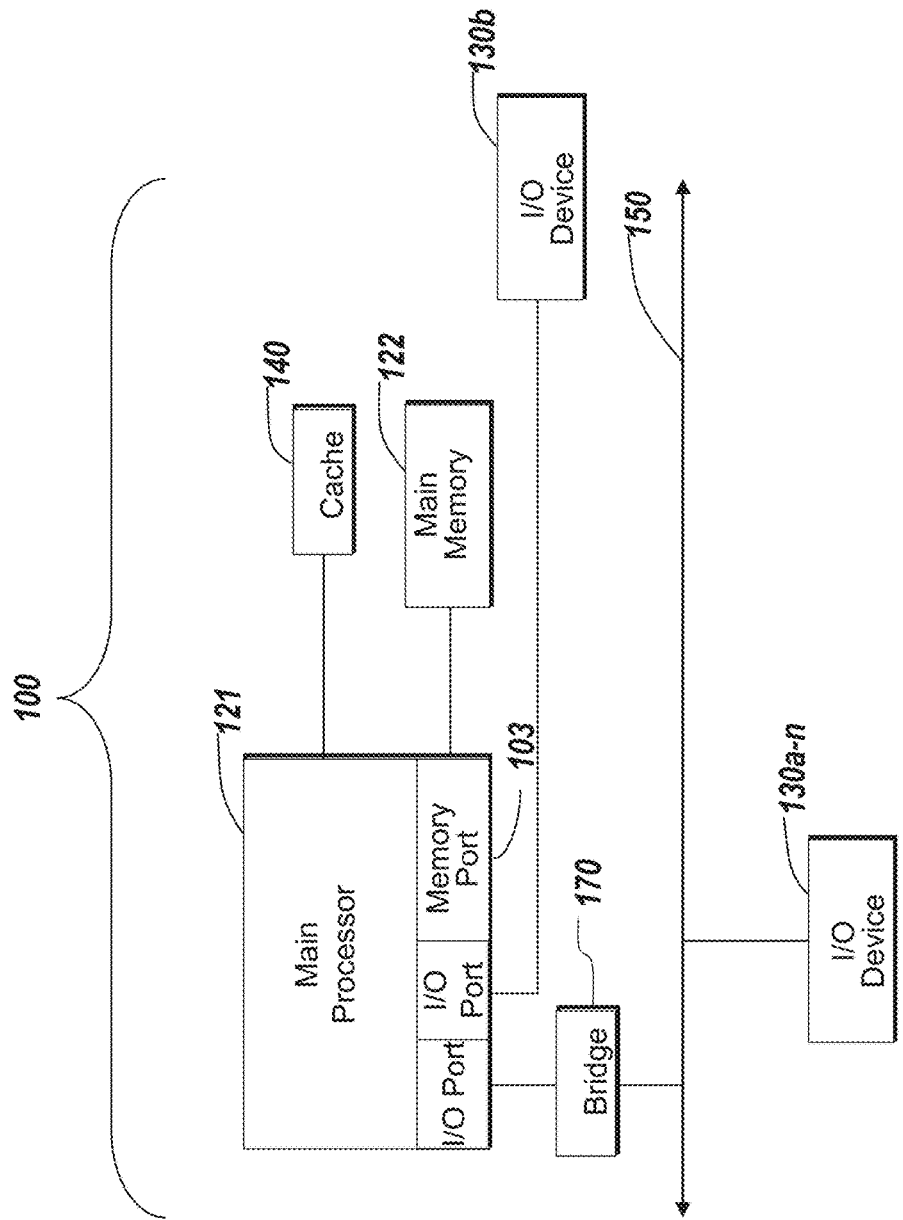

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, an asset fingerprinting system (AFS) software 120, and/or other software, among others. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multitouch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the AFS software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102*a*-102*n* may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Asset Fingerprinting

The present disclosure relates to systems and methods for asset fingerprinting or classification in computer environments, such as enterprise or corporate networks, cloud systems, banking systems, electric utility systems or networks of medical devices, among others. Fingerprinting or classifying an asset of a computer environment, as used herein, involves determining a profile of the asset. An asset profile can include or define an asset type or category, an asset operating system, a solution or solution stack to which the asset belongs, an asset task, an asset geolocation, other asset characteristic or a combination thereof.

Over time, a computer environment can experience various modifications. Such changes can include adding new assets or a new solution, removing or disconnecting one or more existing assets, changing the configuration of one or more assets, installing or un-installing software assets or programs or modifying the architecture of the computer environment or a subsystem thereof, among others. In most cases, many of these changes are not documented. In other words, system administrators or other network staff associated with the computer environment may not have a full picture of the current architecture of the computer environment or the assets thereof. For most computer environments, about 80% of the corresponding assets are usually published or identifiable (e.g., known to system or IT administrators), while about 20% of the assets are unidentifiable. Furthermore, external or remote assets can connect to, or disconnect from, the computer environment on a regular basis.

Hackers or cyber criminals may connect a rogue asset to a computer environment to mount a cybersecurity attack, such as a man in the middle. Usually, the rogue asset is not under the administrative control of the system administrators or the network staff. For instance, a rogue dynamic host configuration protocol (DHCP) server, such as a modem or router with built-in DHCP server capability, may connect to the computer environment and provide information (e.g., IP addresses, gateways or domain name servers) to clients that is different from the information provided by normal DHCP servers. In many cases, the system administrators or the network staff may not discover the rogue asset until it has already inflicted serious harm or damage to the computer environment.

The systems and methods described herein provide a non-invasive approach for managing and fingerprinting assets in a computer environment. The fingerprinting or classification of assets allows for detecting any rogue assets. For instance, once the profile of an asset is identified, the systems and methods described herein can check the asset and the corresponding profile against known architecture and/or configuration settings of the computer environment. For some types of assets, a detected discrepancy can be indicative of a rogue asset. In addition, the non-invasive identification and fingerprinting of assets allows for a practical and fast approach for tracking and monitoring the assets forming the computer environment or a portion thereof, and allows for identifying rogue assets among unidentifiable or unknown assets within the computer environment.

Figure 2:
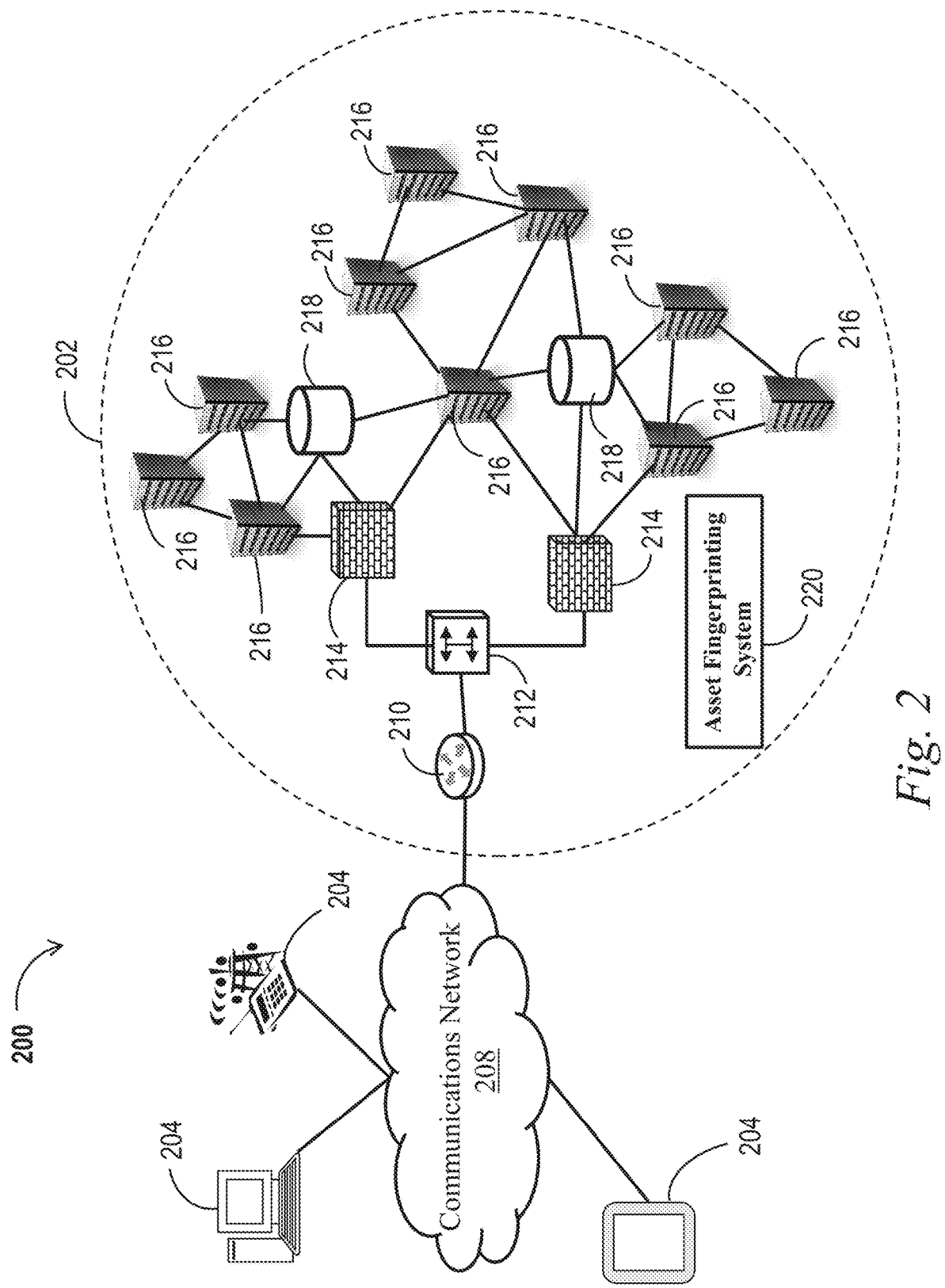
FIG. 2 is a block diagram illustrating an example network environment where asset fingerprinting or classification can be employed, according to an example embodiment.

Referring to FIG. 2, a block diagram illustrating an example network environment 200 where asset fingerprinting or classification can be employed, according to example embodiments. The network environment 200 can include a computer environment 202 and a plurality of communication devices 204. The computer environment 202 and the plurality of communication devices 204 can be communicatively coupled via a communications network 208. The communication network 208 can include a cellular network, a landline network, an optical network, a metropolitan area network (MAN), a wide area network (WAN), the Internet, a private network, a public network or a combination thereof, among others. The communication network 208 can be similar to the network 104 of FIG. 1A. The communication network 208 can be distributed over a plurality of geolocations, metropolitan areas or countries.

The communication devices 204 can include devices of the computer environment 202, such as client devices connecting remotely to the computer environment 202. The communication devices 204 can include client devices, such as the client devices 102 of FIGS. 1A and 1B. For instance, the communication devices 204 can include a smart phone, a tablet device, a mart watch, other handheld device, a laptop, a desktop, a medical device with communication capability, an automated teller machine (ATM), a circuit device, a sensor device, a camera device, a sensor device, a drone, other device with communication capabilities or a combination thereof, among others. The communication devices 204 can be configured to send data to, or access data from, the computer environment 202 via the communication network 208. The computer environment 202 can be arranged in one or more geolocations or sites, and the communication devices 204 can include a device (e.g., a wireless device or an ATM) of the computer environment 202 that is located remotely from the one or more sites. The communication devices 204 can include one or more devices, such as laptops, desktops, smart phones, handheld devices or computer servers that are not part of the computer environment 202 but are accessing one or more resources of the computer environment 202. Such devices can include rogue devices or devices inadvertently connected to the computer environment 202.

The computer environment 202 can include an enterprise computer network, a cloud network or system, a banking computer system, a power grid system, a medical device network, a social network, a communications network (e.g., wireless communications network), a media streaming system or network, a security monitoring system or a combination thereof, among others. The computer environment 202 can be distributed over, or can include, a plurality of sites associated with distinct geolocations. The computer environment 202 can include one or more solution stacks or solutions. The computer environment 202 can include one or more network devices, such as router 210, network switch 212, a modem device, a wireless router or a combination thereof. The computer environment 202 can include one or more firewall devices (or systems) 214, a plurality of computer servers 216, one or more databases 218, and an asset fingerprinting system (AFS) 220. The computer environment 202 can include one or more other computing devices, electronic devices, electromechanical devices, or other devices of other type. The computer environment 202 can include software assets, such as software applications, software programs and/or software platforms. The computer environment 202 can include data assets, such as data folders, data files, data structures or a combination thereof.

The network devices can manage or facilitate communication channels within the computer environment 202 as well as communication channels with external devices. The network devices can offer IP addresses, domain name servers, default gateway and/or Windows Internet name service (WINS) servers to client devices or communication devices 204. The network devices can collect data indicative of network performance, such as bandwidth usage, packet drop rate, number or rate of out of order packets, transport control protocol (TCP) retransmits, latency or a combination thereof among others. In some implementations, one or more network devices or a network database can maintain the collected network performance data. The collected network performance data can include information related to measured network performance parameters such as time (e.g., timestamps), traffic destination, traffic source, communication link, communication session identifier or a combination thereof, among others.

Each firewall device 214 can maintain a corresponding defined set of security rules. A system administrator of the computer environment 202 or the threat response system 220 can manage the defined set of security rules for each firewall device 214. The firewall device(s) 214 can monitor incoming and/or outgoing network traffic, and decide whether to allow or block specific traffic based on the corresponding set of security rules. The firewall device(s) 214 can also collect data related to security of incoming and/or outgoing network traffic over time. The firewall device(s) 214 or a security database can store the collected security data. The collected security data can include, for example, logs of blocked and/or allowed network traffic, reasons (e.g., invoked security rule) for blocking network traffic, requesting entity and/or source of blocked network traffic or a combination thereof, among others.

The computer servers 216 can include one or more email servers, one or more application servers, one or more client servers, one or more file transfer protocol (FTP) servers, one or more web servers, one or more SQL servers, one or more MICROSOFT EXCHANGE servers, one or more communication servers, one or more authentication servers or a combination thereof, among others. The authentication server(s) can maintain data indicative of successful and/or failed authentications including, for example, a device identifier, a time stamp and/or used login identifier for each authentication or authentication attempt. The application server(s) can maintain data (e.g., session logs) indicative of past and/or current user sessions. For each user session, the application server(s) can store session timing information (e.g., start, end and/or duration), user identification of user initiating the session, device identifier of the communication device 204 initiating or participating in the sessions, data exchanged during the session, activities or tasks performed during the session or a combination thereof. The one or more servers 216 or resources thereof can be accessible by the communication devices 204. Each of the computer servers 216 can be accessible via the firewall(s) 214. In some implementations, one or more computer servers 214 may not be arranged behind the firewall(s) 214.

The database(s) 218 can be maintained by one or more computer servers 216 or one or more storage devices. The database(s) 218 and/or the computer servers 216 can be located in a site of the computer environment 202 or a data center hosting some services associated with the computer environment 202. The database(s) 218 can store user authentication data, other user data, application data, web pages, services data, business data, research and development data, marketing data, human resources data or a combination thereof, among others. The data stored by the database(s) 218 can be used by the computer servers 216, or can be accessible by the communication devices 204. The database(s) 218 can store data with different sensitivity or importance. For instance, different access rights can be associated with distinct data sets. The access rights for each data set can be assigned to one or more users or communication devices 204 based on, for example, user profiles, defined firewall security rules, relevance of the data set to various tasks or projects, importance of the data set or a combination thereof.

The computer servers 216, the databases 218, the network devices and/or the other devices of the computer environment 202 can be communicatively coupled to each other. In general, various devices of the computer environment 202 can be dependent on each other. The interdependencies can include data dependency, software dependency, storage dependency, communication dependency, security dependency or a combination thereof, among other dependencies.

Besides the various devices discussed above, the computer environment 202 can include software assets, such as software platforms, operating systems, software programs, web or online applications and/or software services. The computer environment 202 can include data assets, such as databases, data files, media files and/or data structures. The assets described herein in relation with the computer environment 202 may not be all published or accounted for in any records of the computer environment 202. For instance, some of the assets may be connected to, or integrated within, the computer environment 202 but they may not be accounted for in an asset management database or an asset inventory of the computer environment 202. Such assets could have been added in the past to the computer environment 202 without updating the asset management database or the asset inventory. Alternatively, such assets can be rogue assets (e.g., a hacker device or software).

The asset fingerprinting system 220 can scan, query or ping various assets of the computer environment 202, record response parameters and cluster the assets based on the recorded response parameters. The asset fingerprinting system 220 can detect for each cluster of assets a corresponding profile that reflects one or more common characteristics or features of the assets in the cluster. The asset fingerprinting system 220 can assign the profile of a cluster to an unidentified asset of the cluster. The asset fingerprinting system 220 can determine a classification (e.g., rogue or not) of the unidentified asset based at least on the profile of the cluster assigned to the unidentified cluster. The asset fingerprinting system 220 can be implemented as software, firmware, hardware or a combination thereof. For instance, the asset fingerprinting system 220 can include one or more computing devices, such as device 100, executing computer code instructions to perform the methods or processes described herein. The asset fingerprinting system 220 can be communicatively coupled, either directly or indirectly, to various assets of the computer environment 202. The asset fingerprinting system 220 can be integrated in, or communicatively coupled to, the computer environment 220.

Figure 3:
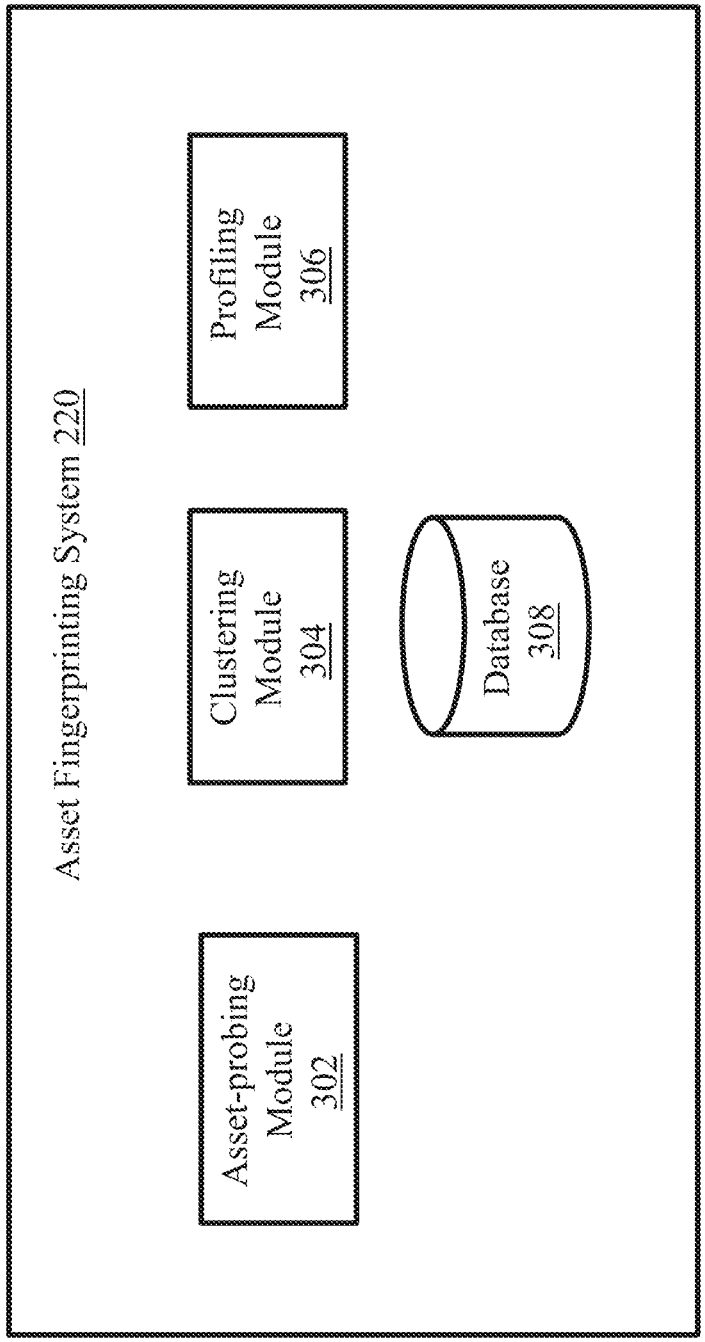
FIG. 3 shows an example block diagram of an asset fingerprinting system, according to an example embodiment.

Referring to FIG. 3, an example block diagram of the asset fingerprinting system 220 is shown, according to an example embodiment. In brief overview, the asset fingerprinting system 220 can include an asset-probing module 302, a clustering module 304, a profiling module 306, and database 308. Each of the modules (or components) of the asset fingerprinting system 220 can be implemented as a hardware module, a software module, a firmware module, or a combination thereof. For instance, the asset fingerprinting system 220 can include one or more processors such as processor 121 of FIGS. 1C and 1D and a memory such as the main memory 122 or the cache memory 140. The memory can store computer code instructions, which when executed by the one or more processors can cause the one or more processors to perform methods described herein (e.g., method 400 of FIGS. 4 and 6) or steps thereof associated with the asset fingerprinting system 220. The functionalities of each of these modules are discussed in further detail below with regard to FIG. 4.

Figure 4:
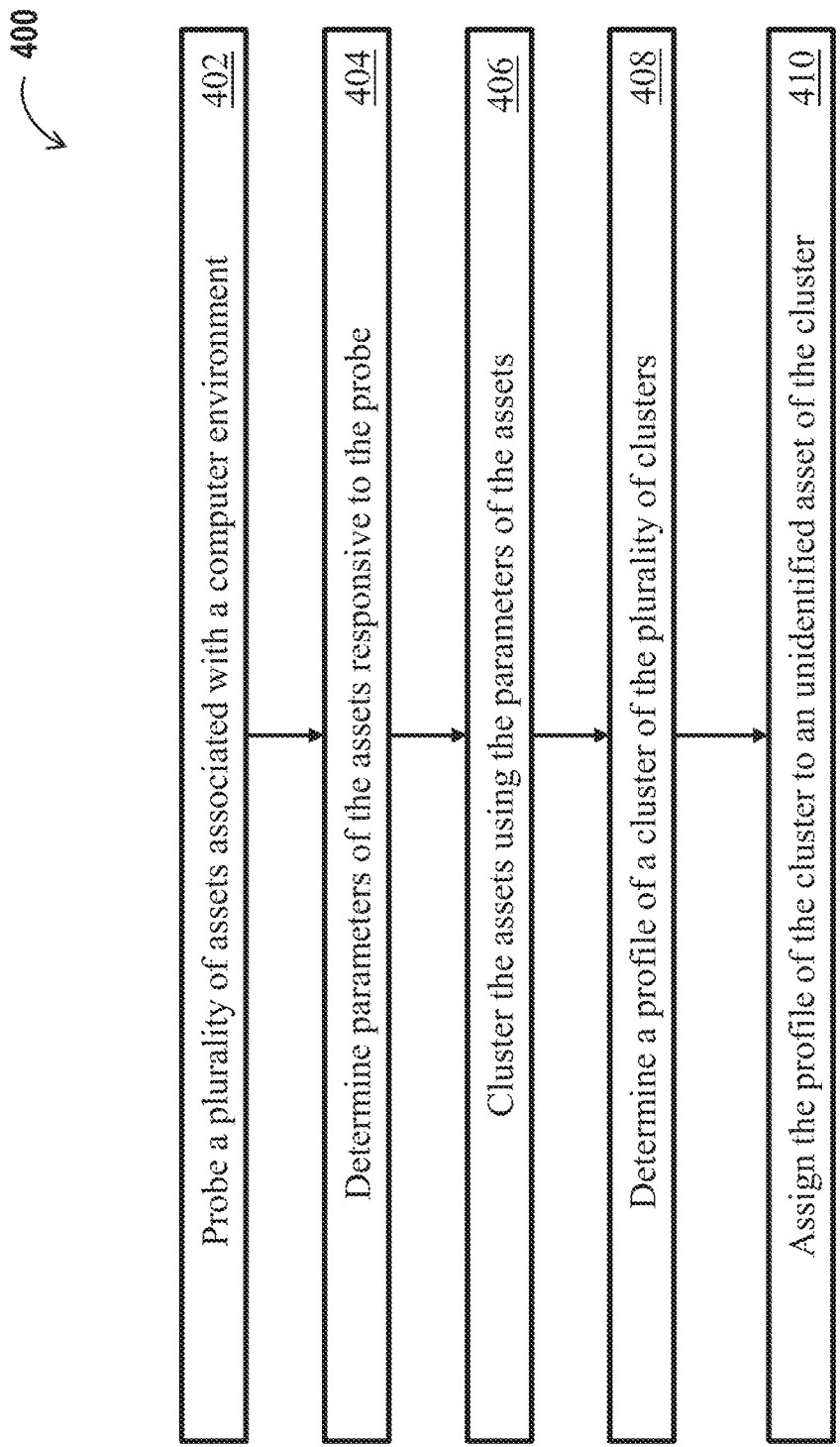
FIG. 4 shows a flowchart illustrating a method asset fingerprinting, according to an example embodiment.

FIG. 4 shows a flowchart illustrating a method 400 for asset fingerprinting in a computer environment, according to an example embodiment. In a brief overview, the method 400 can include the asset fingerprinting system 220 probing a plurality of assets of the computer environment 202 (STEP 402), and determine parameters for the plurality of assets responsive to the probe (STEP 404). The method 400 can include the asset fingerprinting system 220 clustering, using the parameters, each of the plurality of assets into respective cluster of a plurality of clusters of assets (STEP 406). The method 400 can include determining a profile of a cluster of the plurality of clusters (STEP 408), and assigning the profile of the cluster to an unidentified asset of the cluster (STEP 410).

Referring to FIGS. 3 and 4, the method 400 can include the asset-probing module 302 probing a plurality of assets of the computer environment 202 (STEP 402). The asset-probing module 302 can probe all, or a subset of, the assets of the computer environment 202. For instance, the asset-probing module 302 can probe all computer servers 216, computer servers of a given type, network devices, firewalls 214, assets associated with a given solution or solution stack, client devices, cloud or online applications or a combination thereof. The asset-probing module 302 can probe the assets on a regular basis or responsive to some detected event. For each probing event, the asset-probing module 302 can probe the assets simultaneously or iteratively one asset after the other.

Probing the assets can include the asset-probing module 302 sending queries, pings or tasks to the plurality of assets. The asset-probing module 302 can send a smokeping or types of pings or ping commands to the plurality of assets. For instance, some ping commands can allow for specifying the number of pings or echo requests to send to each asset, sending pings continuously until stopped by a user, setting the size of the ping packet, or controlling other ping parameters. Repeated requests or pings consume computational resources of the destination assets and/or network resources of the destination assets as well as other network assets of the computer environment 202. In some implementations, the asset-probing module 302 can trigger or send pings according to predefined probing patterns, e.g., according to maintained probing templates or scripts. The templates or scripts can include addresses of the destination assets, the timing of probing events, the frequency of probing events, the ping commands to be used and their respective order. The asset-probing module 302 can maintain various templates or scripts, for example, associated with different probing events, different types of assets to be probed or different operating systems.

The method 400 can include the asset-probing module 302 receiving or determining one or more parameters for each asset responsive to the probe (STEP 404). The asset-probing module 302 can determine and record, for each probed asset, whether a response was received, the corresponding response latency (e.g., relative to the time corresponding query or ping was sent) and/or other response parameters. In some implementations, the asset-probing module 302 can determine and/or record, for each probed asset, a corresponding response vector. For instance, in the case of repetitive pings or requests, the asset-probing module 302 can record a corresponding vector of response latencies for each probed asset. In some implementations, the asset-probing module 302 can probe various ports of a hardware asset. The asset-probing module 302 can store the recorded response data (or response vectors) in the database 308. The asset-probing module 302 can store each response vector or response parameter in association with an indication or identifier of the corresponding probed asset.

The method 400 can include the clustering module 304 clustering each asset into a respective cluster of a plurality of clusters of assets, using the parameters of the assets (STEP 406). The parameters can be indicative of performance parameters of the corresponding assets. The response time(s) of each asset can be indicative of the CPU usage and/or bandwidth usage of the asset. For instance, a relatively long response time can be indicative of relatively high CPU usage or high bandwidth usage of the corresponding asset. The clustering module 304 can employ a clustering algorithm to cluster the recorded response parameters or response vectors into a plurality of clusters. In clustering the recorded response parameters or vectors, the clustering module 304 can employ partitioning methods, a hierarchical clustering approach, fuzzy clustering, density-based clustering, model-based clustering or some other clustering technique. In the clustered data, the recorded response data for each asset can be represented by a corresponding response vector. As such, clustering the response vectors is in fact a clustering of the probed assets.

The method 400 can include the profiling module 306 determining a profile of a cluster of assets (STEP 408). The clustering performed in STEP 406 results in a plurality of clusters or groups of assets, with each cluster having relatively similar parameters or parameter vectors. For each cluster or group of assets, the profiling module 306 can collect or acquire information indicative of characteristics or features of the assets in the cluster. For instance, the profiling module 306 can query each (or a subset) of the assets in the cluster for specific asset information, such as asset name, asset description, asset IP address, an operating system associated with the asset, asset deployment date and/or asset geolocation, among others. Determining a profile of the cluster can include determining a common category or a common type of the assets in the cluster.

In some implementations, the profiling module 306 can request such information from an asset management (or asset inventory) database of the computer environment. Determining a profile of the cluster can include querying an asset management database for information about assets in the cluster, and determining the profile of the cluster based on information received responsive to querying the asset management database. The profiling module 306 can acquire information about one or more assets of the cluster from various logs of the computer environment. The logs can include communication logs, configuration logs, error logs and/or other types of logs available. The profiling module 306 may request information about a given asset from other assets, such as the firewall 214, databases 218, network devices, software applications, data logs, among others.

The profiling module 306 may not be able to query, or obtain information about, all assets in a given group or cluster. For instance, some unidentified or unknown assets (e.g., not listed or accounted for in the asset management database or asset inventory database) in the cluster may not be responsive to queries from the profiling module 306 or may modify their headers or provide false information when responding to such queries. In general, the profiling module 306 can obtain asset information for most of the assets in a cluster but not necessarily all assets in the cluster.

For each cluster of assets, the profiling module 306 can compare the obtained asset information for different assets in the cluster to each other to identify common features or characteristics of the assets in the cluster. For instance, the profiling module 306 can determine that most of the assets (e.g., except non-responsive assets) in the cluster are server 216 or belong to a specific type or category of servers. The profiling module 306 may determine that most of the assets in the cluster share the same operating system, include similar software applications, have similar computing resources or similar CPU usage patterns, are accessed by the same group of users or a combination thereof.

The profiling module 306 can generate a cluster profile based on the comparison of asset information for various assets in the cluster. The profiling module 306 may use predefined profile templates to generate the cluster profile. The cluster profile can include or specify the features or characteristics that are determined to be common to most of the assets in the cluster. The profiling module 306 can generate, for each cluster of assets, a corresponding cluster profile. The profiling module 306 can store the cluster profiles in the database 308. In some implementations, the profiling module 306 can store each cluster profile in association with the corresponding cluster.

The method 400 can include the profiling module 306 assigning the profile of a cluster to an unidentified asset of the cluster (STEP 410). In some implementations, the profiling module 306 can associate or link the cluster profile to each of the assets in the corresponding cluster. In some implementations, the profiling module 306 may generate for each asset in the cluster a corresponding asset profile based on common features in the cluster profile. For instance, the cluster profile may include various asset features with corresponding frequency or recurrence in the cluster. Each asset profile can include common (or most recurring) features in the cluster profile. The asset profile may further include additional asset features that are specific to the corresponding asset. For example, the profiling module 306 can acquire additional information for identified (or identifiable assets) from the asset management database, communication logs and/or other logs of the computer environment 202. The asset profile of an identified (or identifiable asset) can include the common features from the cluster profile and additional features determined based on information received from the asset management database, communication logs and/or other logs of the computer environment 202. For an unidentified asset in the cluster, the corresponding asset profile may include only asset features or characteristic that are common in the corresponding cluster. The asset fingerprinting system 220 can output the asset profile (or asset features) for each probed asset, including The profiling module 306 or the asset fingerprinting system 220 can further classify the unidentified asset (or determine further information about the unidentified asset) by identifying one or more second assets of the computer environment that communicated with the unidentified asset, and querying the one or more second assets for information about the first asset. The profiling module 306 or the asset fingerprinting system 220 can identify the one or more second assets using one or more communication logs of the computer environment. In some implementations, the profiling module 306 or the asset fingerprinting system 220 can identify a geolocation of the unidentified asset (e.g., based on IP address) and query all assets in that geolocation.

The profiling module 306 or the asset fingerprinting system 220 can determine based on information received from the one or more second assets whether the unidentified asset is an asset of the computer environment 202 or a rogue asset. For example, the profiling module 306 or the asset fingerprinting system 220 can compare the information received from the second assets to cluster profile to check for any discrepancies. A discrepancy may be due to the unidentified asset changing its header and providing false information about itself to other devices or assets it communicates with. If no discrepancy is found and the additional information acquired from the second devices indicate that the unidentified asset is an asset of the computer environment, the asset fingerprinting system 220 can either update the asset management database or provide a signal to recommend updating the asset management database to further include the unidentified asset. If the information received from the second assets (may be together with other information from the communication logs, firewall logs or other sources) indicate some discrepancy when compared with the cluster profile or indicate some suspicious activities, the asset fingerprinting system 220 may raise a flag or provide an alert indicating that the unidentified asset is a rogue asset. The asset fingerprinting system 220 can render or output a warning or an alert signal related to the flagged asset.

The methods, e.g., method 400, described in this disclosure can be carried out by computer code instructions stored on a computer-readable medium. The computer code instructions, when executed by one or more processors of one or more computing device, can cause the computing device to perform the method(s) described herein.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A system comprising:
   one or more processors communicatively coupled to a computer environment; and
   a memory storing computer code instructions, the computer code instructions, when executed by the one or more processors, cause the one or more processors to:
   transmit, via a communication network and according to probing scripts, a plurality of probe queries to each device of a plurality of devices associated with the computer environment, the probing scripts specifying types and frequencies of probe queries used for each device of the plurality of devices and the plurality of probe queries including at least one ping command configured to measure, for each device of a plurality of devices, a corresponding response latency;
   determine, from responses of the plurality of probe queries received from the plurality of devices, parameters for the plurality of devices, the parameters including, for each device of the plurality of devices, the corresponding response latency;
   record in memory the parameters from the responses;
   cluster, by a clustering module applying a clustering algorithm to the recorded parameters, the plurality of devices into a plurality of clusters, clustered data of the plurality of clusters comprising recorded parameters represented by parameter vectors;
   determine, by a profiling module based on the plurality of clusters and the clustered data, a profile of a first cluster of the plurality of clusters, the profile stored in a database in association with the first cluster and defining one or more common features of devices of the first cluster and including at least one of a common category or a common type of the devices in the first cluster;
   assign, by the profiling module, the profile of the first cluster to an unknown device of the first cluster, the unknown device not listed in an asset management record of the computer environment;
   identify, by the profiling module using one or more communication logs, one or more other devices of the computing environment that communicated with the unknown device;
   obtain, by the profiling module, additional information about the unknown device from the identified one or more other devices of the computer environment;
   compare, by the profiling module, the additional information about the unknown device received from the one or more other devices to the profile of the first cluster stored in the database; and
   determine, by the profiling module, the unknown device to be a potential rogue device based on the comparison identifying a discrepancy; and
   provide an alert indicating that the unknown device is a rogue device.

2. The system of claim 1, wherein in determining the profile of the first cluster, the one or more processors are configured to:
   query each device of the first cluster for device information;
   compare device information received from separate devices of the first cluster; and
   identify the one or more common features of the devices of the first cluster based on a comparison of the device information received from separate devices of the first cluster.

3. The system of claim 2, wherein in querying each device of the first cluster for device information, the one or more processors are configured to query each device of the cluster for at least one of:
   device name;
   device description;
   device serial number; or an operating system associated with the device.

4. The system of claim 1, wherein in determining the profile of the first cluster, the one or more processors are configured to:
   query an asset management database for information about devices of the first cluster; and
   determine the profile of the first cluster based on information received responsive to querying the asset management database.

5. The system of claim 1, wherein in clustering the plurality of devices of the computer environment, the one or more processors are configured to use at least one of:
   a hierarchical clustering approach;
   fuzzy clustering;
   density-based clustering; or
   model-based clustering.

6. The system of claim 1, wherein the one or more processors are further configured to:
   identify, using one or more communication logs of the computer environment, one or more second devices of the computer environment that communicated with the unknown device; and
   query the one or more second devices for the additional information about the unknown device.

7. A method comprising:
   transmitting, by one or more processors via a communication network and according to probing scripts, a plurality of ping commands to each device of a plurality of devices associated with the computer environment, the probing scripts specifying types and frequencies of probe queries used for each device of the plurality of devices and the plurality of probe queries including at least one ping command configured to measure, for each device of a plurality of devices, a corresponding response latency;
   determining, by the one or more processors, from responses of the plurality of probe queries received from the plurality of devices, parameters for the plurality of devices, the parameters including, for each device of the plurality of devices, the corresponding response latency;
   recording, by the one or more processors in memory, the parameters from the responses clustering, by a clustering module configured on the one or more processors applying a clustering algorithm to the parameters, the plurality of devices into a plurality of clusters, clustered data of the plurality of clusters comprising recorded parameters represented by parameter vectors;

determining, by a profiling module configured on the one or more processors based on the plurality of clusters and the clustered data, a profile of a first cluster of the plurality of clusters, the profile stored in a database in association with the first cluster and defining one or more common features of devices of the first cluster and including at least one of a common category or a common type of the devices in the first cluster;

assigning, by the profiling module, the profile of the first cluster to an unknown device of the first cluster, the unknown device not listed in an asset management record of the computer environment;

identifying, by the profiling module using one or more communication logs, one or more other devices of the computing environment that communicated with the unknown device obtaining, by the profiling module, additional information about the unknown device from the identified one or more other devices of the computer environment;

comparing, by the profiling module, the additional information about the unknown device received from the one or more other devices to the profile of the first cluster stored in the database; and determining, by the profiling module, the unknown device to be a potential rogue device based on the comparison identifying a discrepancy; and providing an alert indicating that the unknown device is a rogue device.

8. The method of claim 7, wherein determining the profile of the first cluster includes:
   querying each device of the first cluster for device information;
   comparing device information received from separate devices of the first cluster; and
   identifying the one or more common features of the devices of the first cluster based on a comparison of the device information received from separate devices of the first cluster.

9. The method of claim 8, wherein querying each asset of the first cluster for asset information includes querying each asset of the first cluster for at least one of:
   device name;
   device description;
   device serial number; or
   an operating system associated with the device.

10. The method of claim 7, wherein determining a profile of the first cluster includes:
   querying an asset management database for information about devices of the first cluster; and
   determining the profile of the first cluster based on information received responsive to querying the asset management database.

11. The method of claim 7, wherein clustering the plurality of devices of the computer environment includes using at least one of:
   a hierarchical clustering approach;
   fuzzy clustering;
   density-based clustering; or
   model-based clustering.

12. The method of claim 7, further comprising:
   identifying, using one or more communication logs of the computer environment, one or more second devices of the computer environment that communicated with the unknown device; and
   querying the one or more second assets for the additional information about the unknown device.

13. A non-transitory computer-readable medium storing computer executable instructions, the computer executable instructions when executed by one or more processors cause the one or more processors to:
   transmit, via a communication network and according to probing scripts, a plurality of ping commands to each device of a plurality of devices associated with the computer environment, the probing scripts specifying types and frequencies of probe queries used for each device of the plurality of devices and the plurality of probe queries including at least one ping command configured to measure, for each device of a plurality of devices, a corresponding response latency;
   determine, from responses of the plurality of probe queries received from the plurality of devices, parameters for the plurality of devices, the parameters including, for each device of the plurality of devices, the corresponding response latency;
   record in memory the parameters from the responses;
   cluster, by a clustering module applying a clustering algorithm to the recorded parameters, the plurality of devices into a plurality of clusters, clustered data of the plurality of clusters comprising recorded parameters represented by parameter vectors;
   determine, by a profiling module based on the plurality of clusters and the clustered data, a profile of a first cluster of the plurality of clusters, the profile stored in a database in association with the first cluster and defining one or more common features of devices of the first cluster and including at least one of a common category or a common type of the devices in the first cluster;
   assign, by the profiling module, the profile of the first cluster to an unknown device of the first cluster, the unknown device not listed in an asset management record of the computer environment;
   identify, by the profiling module using one or more communication logs, one or more other devices of the computing environment that communicated with the unknown device;
   obtain, by the profiling module, additional information about the unknown device from the identified one or more other devices of the computer environment;
   compare, by the profiling module, the additional information about the unknown device received from the one or more other devices to the profile of the first cluster stored in the database; and
   determine, by the profiling module, the unknown device to be a potential rogue device based on the comparison identifying a discrepancy.

* * * * *